(12) United States Patent
Muhammad et al.

(10) Patent No.: US 7,249,788 B2
(45) Date of Patent: Jul. 31, 2007

(54) CONNECTOR ASSEMBLY FOR MALE AND FEMALE MEMBERS

(75) Inventors: Anis Muhammad, Mississauga (CA); Jeff Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 151 days.

(21) Appl. No.: 10/782,669

(22) Filed: Feb. 19, 2004

(65) Prior Publication Data

US 2005/0184518 A1   Aug. 25, 2005

(51) Int. Cl.
*F16L 21/06* (2006.01)
(52) U.S. Cl. .................. 285/319; 285/243; 285/322; 285/921
(58) Field of Classification Search ................. 285/319, 285/322, 323, 921, 243
See application file for complete search history.

(56) References Cited

U.S. PATENT DOCUMENTS

| | | | |
|---|---|---|---|
| 2,543,087 A | 2/1951 | Woodling | |
| 2,543,088 A | 2/1951 | Woodling | |
| 3,724,882 A * | 4/1973 | Dehar | 285/243 |
| 3,810,073 A * | 5/1974 | Zajac et al. | 439/352 |
| 4,269,438 A | 5/1981 | Ridenour | |
| 4,332,402 A * | 6/1982 | Shellhause | 285/86 |
| 4,573,716 A * | 3/1986 | Guest | 285/323 |
| 4,781,400 A * | 11/1988 | Cunningham | 285/39 |
| 4,828,297 A * | 5/1989 | Tarum | 285/305 |
| 4,925,217 A | 5/1990 | Ketcham | |
| 4,948,180 A | 8/1990 | Usui | |
| 5,069,489 A * | 12/1991 | Bartholomew | 285/319 |
| 5,141,264 A | 8/1992 | Usui | |
| 5,172,940 A * | 12/1992 | Usui et al. | 285/31 |
| 5,176,412 A * | 1/1993 | Washizu | 285/319 |
| 5,303,963 A | 4/1994 | McNaughton et al. | |
| 5,462,313 A | 10/1995 | Rea et al. | |
| 5,542,717 A | 8/1996 | Rea et al. | |
| 5,738,387 A * | 4/1998 | Guest | 285/322 |
| 6,155,607 A | 12/2000 | Hewitt et al. | |
| 6,267,416 B1 | 7/2001 | Ferreira et al. | |
| 6,343,814 B1 * | 2/2002 | Bucher et al. | 285/319 |
| 6,447,024 B1 * | 9/2002 | Olson | 285/319 |
| 6,536,807 B1 * | 3/2003 | Raymond et al. | 285/93 |
| 6,676,171 B2 * | 1/2004 | Bucher et al. | 285/319 |
| 2003/0168856 A1 * | 9/2003 | Kaminski et al. | 285/319 |

FOREIGN PATENT DOCUMENTS

CA    2217508    10/1997

OTHER PUBLICATIONS

General Motors Corporation, Engineering Standards, General Specification HVAC & PT Cooling, Transmission and Engine Oil Cooler Plumbing System, Feb. 2002.
International Search Report Issued on corresponding PCT case PCT/CA2005/000218 dated May 17, 2005.

* cited by examiner

*Primary Examiner*—James M. Hewitt
(74) *Attorney, Agent, or Firm*—Rideout & Maybee LLP

(57) ABSTRACT

A connector assembly having a male member, a female member and a retainer for releasably securing the male member and the female member. The retainer has inner retainer arms for simultaneously engaging the male member and an interior portion of the female member, and an outer retainer flange for engaging an outer portion of the female member.

19 Claims, 4 Drawing Sheets

CONNECTOR ASSEMBLY FOR MALE AND FEMALE MEMBERS

BACKGROUND

This invention relates to a connector assembly for connecting male and female members.

Many types of connector assemblies exist for releasably connecting sections of fluid-carrying conduits. Such connector assemblies may be used, for example, in the heat exchanging systems of a motor vehicle which incorporate both rigid and flexible tubing elements.

It is desirable for a connector assembly to provide a secure, reliable and durable connection that can be connected and disconnected with relative ease, while at the same time being easy and cost effective to manufacture. Existing connector assembly systems have limitations in one or more of these features.

SUMMARY

Examples of the invention provide a connector assembly having a male member, a female member and a retainer for releasably securing the male member and the female member. The retainer has inner retainer arms for simultaneously engaging the male member and an interior portion of the female member, and an outer retainer flange for engaging an outer portion of the female member.

According to one example, there is provided a connector assembly including a male member having a circumferential external shoulder on an outer surface thereof and a female member having a cavity defined by an inner circumferential wall for receiving the male member. The cavity extends from a first end to an interior portion of the female member and the inner circumferential wall defines an internal shoulder. The tubular female member has a circumferential external shoulder on an outer surface thereof. The retainer member surrounds a portion of the male member. The retainer member includes a plurality of circumferentially spaced resilient internal retainer arms and an annular external retainer flange. The external flange is radially spaced from the internal retainer arms and is connected thereto by a radial joining member. The internal retainer arms each have a distal end for simultaneously engaging the male member external shoulder and the female member internal shoulder when the male member is within the female member. The external flange has a distal end defining a radially inwardly extending protrusion for engaging the female member external shoulder when the male member is within the female member.

According to another example of the invention there is provided a connector assembly including a tubular male member having an increased diameter circumferential portion and a tubular female member having an inner annular wall defining a cavity opening at a first end of the female member for receiving the male member, the inner annular wall having an annular groove formed therein and spaced apart from the first end, the female member having an outer annular wall. A retainer member is provided for releasably joining the male member to the female member, the retainer member including a plurality of resilient interior retainer arms having end portions adapted to simultaneously engage the increased diameter circumferential portion and a side of the annular groove when the male member is joined to the female member to create an interference fit therebetween. The retainer member includes an outer annular flange spaced radially apart from the interior retainer arms and adapted to engage the female member outer annular wall when the male member is joined to the female member. The interior retainer arms are joined to the outer annular flange by a joining member through which the male member extends, the joining member being adapted to engage the female member first end when the male member is joined to the female member.

According to another example of the invention there is provided a retainer member for releasably securing a tubular male member and a tubular female member, the tubular male member having an increased diameter circumferential portion and the tubular female member having an inner annular wall defining a cavity opening at a first end of the female member for receiving the male member, the inner annular wall having an annular groove formed therein and spaced apart from the first end, the female member having an outer annular wall. The retainer member includes interior retainer means for insertion within the cavity for simultaneously engaging the increased diameter circumferential portion and a side of the annular groove when the male member is joined to the female member. The retainer member includes an outer retainer means spaced radially apart from the interior retainer means for engaging the female member outer annular wall when the male member is joined to the female member.

According to another example, there is provided a retainer member for releasably securing a male member to a female member, the retainer member including a joining member having a central opening, a plurality of circumferentially spaced resilient internal retainer arms extending from a first side of the joining member and arranged around the central opening thereof; and an annular outer flange extending from the first side of the joining member and radially spaced outward from the internal retainer arms, the outer flange having a distal end remote from the joining member defining an radially inwardly extending protrusion.

BRIEF DESCRIPTION OF THE DRAWINGS

Like reference numerals are used throughout the Figures to denote similar elements and features.

DETAILED DESCRIPTION OF EXAMPLE EMBODIMENTS

FIGS. 1-6 show an example embodiment of a connector assembly which includes a retainer member 10, a tubular male member 12 and a tubular female member 14. In the illustrated embodiment, the female member 14 and the male member 12 are adapted to be suitably secured to tubing elements. The male and female members are operative in response to insertion of the male member 12 into the female member 14 to releasably connect the male member to the female member and form a continuous fluid passage through the coupling to establish fluid communication between the tubing elements associated with the connector members.

Figure 1:
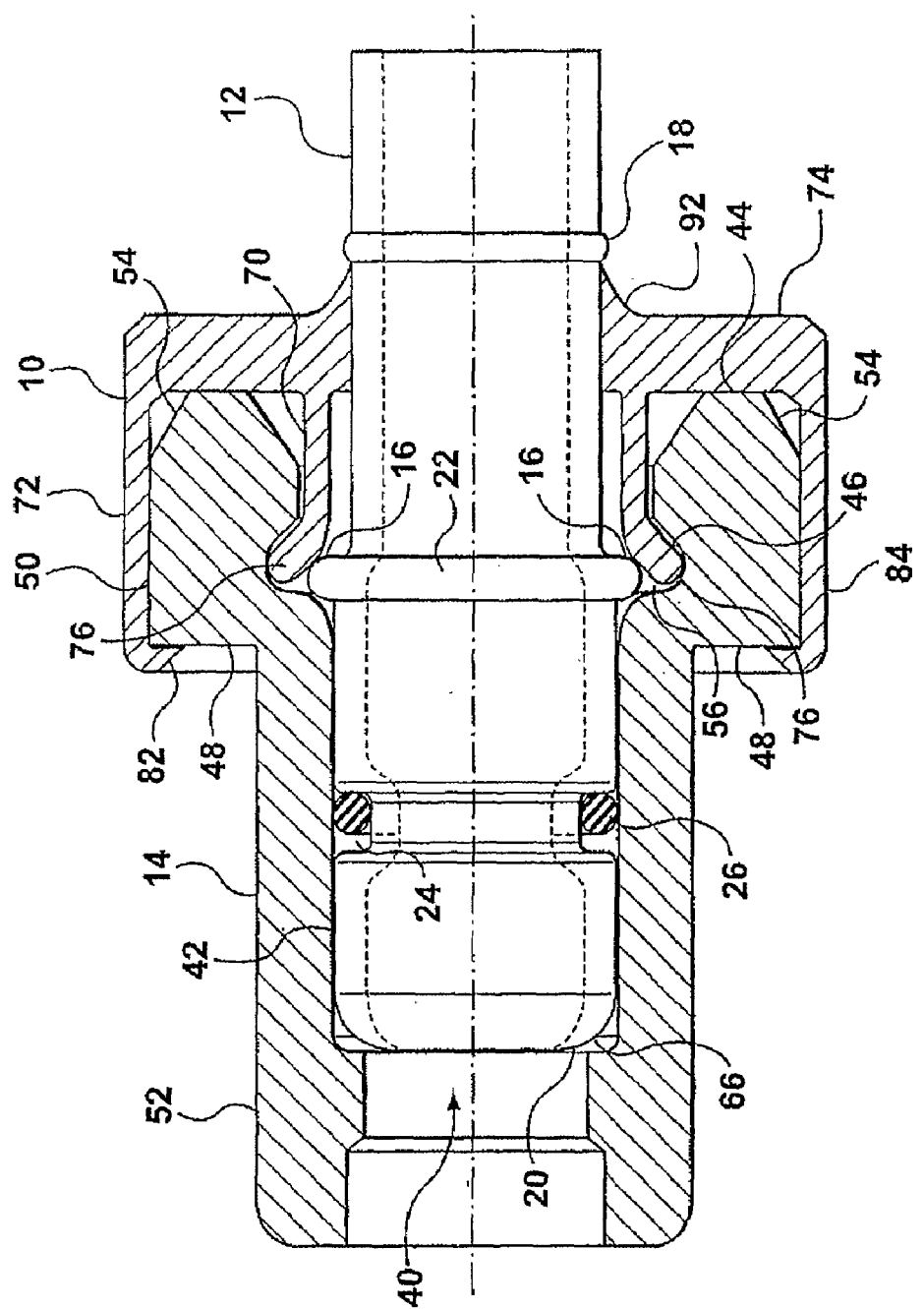
FIG. 1 is a sectional view of a connector assembly in an assembled state, according to example embodiments of the invention.
Figure 2:
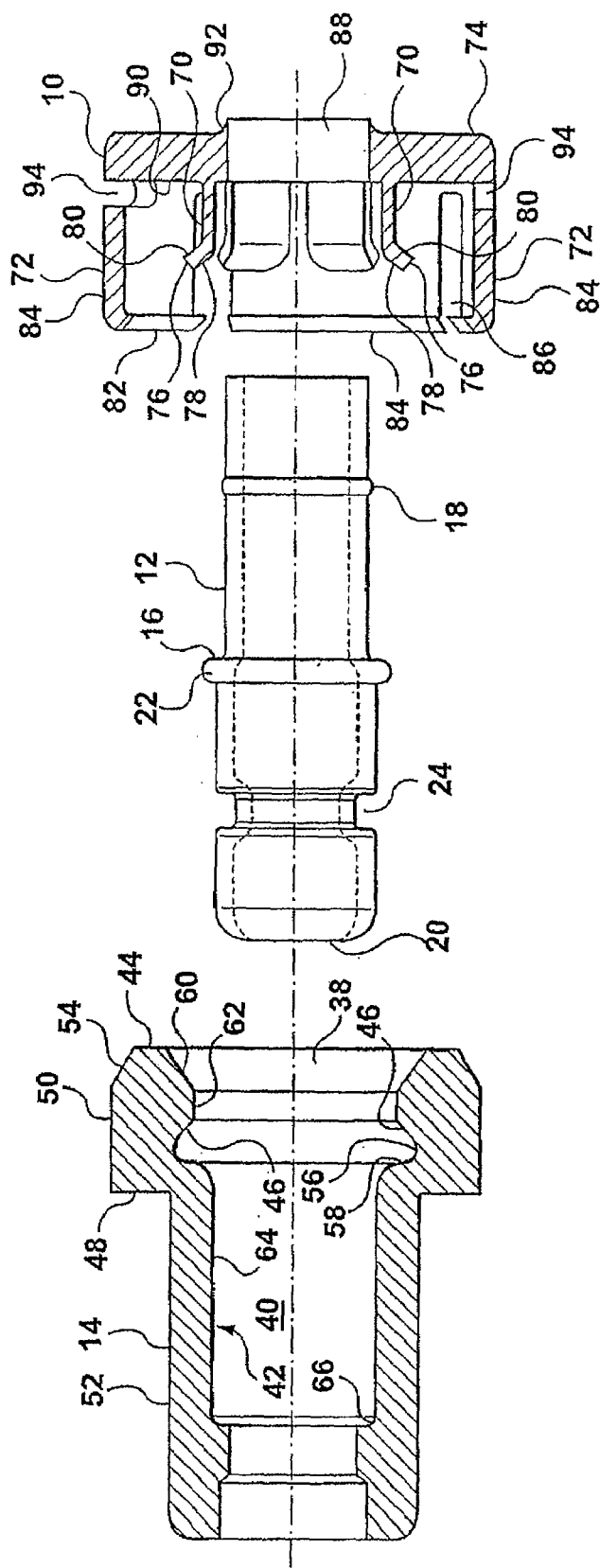
FIG. 2 is a sectional view of the connector assembly of FIG. 1 in a disassembled state.

As best seen in FIG. 2, the male member 12, of a predetermined diameter, has a front or connecting end 20 and includes an outwardly extending shoulder or protrusion 16. In the illustrated example, the shoulder 16 is provided by an annular bead or ring 22 positioned at a predetermined distance from the connecting end 20 of the male member 12. In an example embodiment, the ring 22 is an integral part of the male member 12, the male member 12 with the ring 22 being formed from a metal material such as steel, aluminium, brass or copper or from a non-metallic material such as plastic, or a composite material, among other things. The ring 22 could also be a separate part attached to male member 12. In some example embodiments, the shoulder 16 could be provided by a structure other than ring 22. For example, a step decrease in the diameter of the male member 12 could provide shoulder 16. In an example embodiment, an annular sealing member groove 24 is provided about a circumference of the male member 12 at a location between connector end 20 and ring 22 for receiving a resilient sealing ring 26 (see FIG. 1). In a further example embodiment, the annular groove 24 may alternatively be provided on an inner wall of female member 14.

In the illustrated embodiment, the portion of the male member 12 between ring 22 and front end 20 has a slightly larger diameter than the portion of male member 12 that extends beyond annular ring 22. In some embodiments, this difference in diameter size may not be present, or may be reversed. A further annular ring 18 is formed on the male member 12 on a side of annular ring 22 that is opposite to the connecting end 20.

The female member 14 includes a cavity 40 having an entrance 38 at a connecting or front end 44 of the female member for receiving the male member 12. The cavity 40 is defined by an inner circumferential wall 42. In an example embodiment, the inner wall 42 includes a number of successive wall sections along which the diameter of the cavity 40 varies. In particular, the inner wall 42 includes, beginning at the first end 44 of the female member and working inwards, a first wall section 60, a second wall section 62, a groove wall section 56, and a third wall section 64. The first wall section 60 decreases in diameter inwardly from the first end 44 to the second wall section 62, which has a substantially uniform diameter. Annular groove section 56 is located between second wall section 62 and third wall section 64. Third wall section 64 has a substantially uniform diameter as well. The groove 56 provides a circumferential annular shoulder 46 on one side thereof, and a further shoulder or side 58 which is generally opposed to shoulder 46. An annular shoulder 66 may be provided at the inner end of the third wall section 64.

The female member 14 includes an enlarged outer portion near end 44. In particular, the outer surface of the female member 14 is defined by an outer annular wall which has a first section 50 and a second section 52, the first section 50 being located between the first end 44 and the second section 52 and having an outer diameter greater than that of the second section 52. An annular shoulder 48 that faces away from end 44 forms the transition between the first outer wall section 50 and the second outer wall section 52. The outer annular wall includes a third section 54 that extends from the first end 44 to the second outer wall section 50. The diameter of the third section 54 increases from the first end 44 to the second section 50. Thus, exterior wall section 54 and interior wall section 60 are bevelled in opposite directions at first end 44. As with male tubular member 12, female member 14 may be formed from a material such as steel, aluminium, brass, copper or other metal or metal alloy material, or may be made from a material such as plastic or a composite material, or other suitable materials.

The retainer member 10 is adapted to be slid along the male member 12 and includes a disc-like central body or joining member 74 from which a plurality of internal or interior retainer arms 70 axially extend. The joining member 74 includes a central opening 88 through which the male member 12 passes. The internal retainer arms 70 are arranged about a circumference of the central opening 88 and are spaced slightly back from the opening 88. An outer retaining flange 72 extends from around an outer edge of the joining member 74 such that the outer retainer flange 72 is radially spaced from the internal retainer arms 70.

The retainer arms 70 are resilient extensions which extend substantially perpendicular from an inner surface 90 the joining member 74. The internal retainer arms 70 extend along a longitudinal axis of the male member 12. The retainer arms 70 and the external flange 72 are both formed from a resilient material such that they can be temporarily deformed when the male member 12 is connected to and disconnected from the female member 14. In an example embodiment, the retainer 10 is of unitary construction and formed from a resilient material such as plastic. However, in various embodiments the retainer 10 may be formed from other materials including metal and composite materials, and may be formed as separate pieces that are subsequently connected together.

The specific shape of the retainer arms 70 is determined by the force needed to mount the retainer 10 and the force needed to retain the male member 12 in the female member 14. In an example embodiment, the internal retainer arm 70 each include a distal end 76 spaced apart from the joining member 74. The distal ends 76 are angled radially outward and have opposite facing first and second sides 78, 80.

Figure 3:
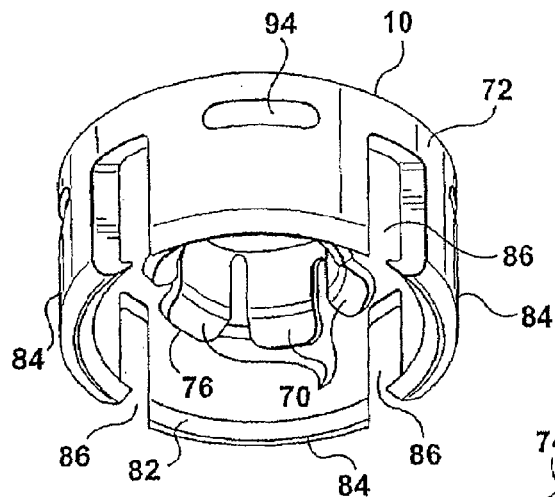
FIG. 3 is a perspective view of a retainer of the connector assembly of FIG. 1.
Figure 4:
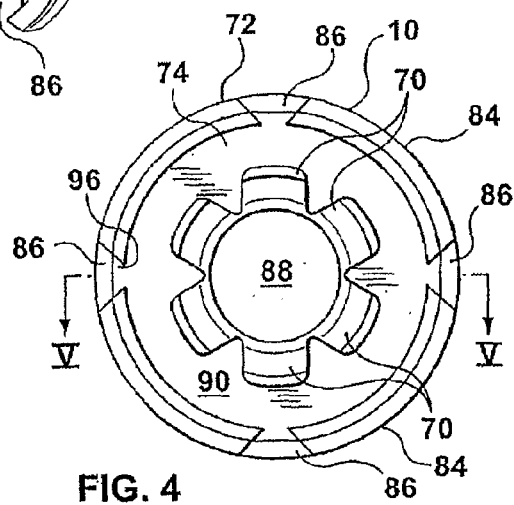
FIG. 4 is an end view of the retainer of FIG. 3.
Figure 5:
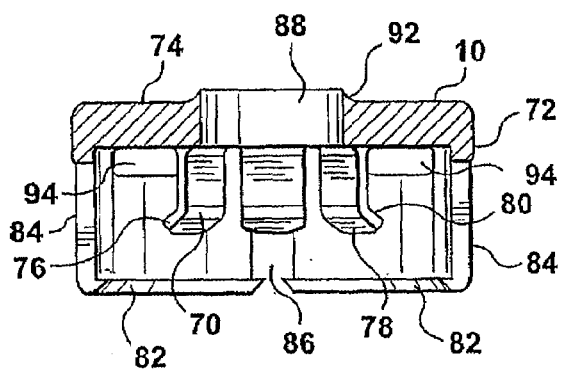
FIG. 5 is a sectional view of the retainer, taken along the line V-V of FIG. 4.
Figure 6:
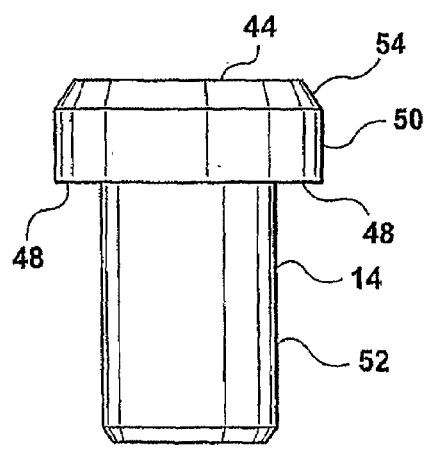
FIG. 6 is a side elevation of a female member of the connector assembly of FIG. 1.

As best seen in FIGS. 3-5, in an example embodiment, the retainer 10 includes six circumferentially spaced resilient internal retainer arms 70. However, more or fewer than six retainer arms 70 could be present in various embodiments.

In an example embodiment, the external flange 72 includes a plurality of circumferentially spaced, axially extending slots 86 effectively dividing the flange 72 into a plurality of external retainer arms 84. An inwardly extending protrusion or lip 82 is provided at a forward end of each of the external retainer arms 84. Semi-circumferential tooling slots or openings 94 are formed through the external flange 72 near the joining member 74 for receiving a removal tool, as will be explained in greater detail below.

As shown in FIGS. 1 and 2, the first inner wall section 60 and second inner wall section 62 of the female member 14 are large enough to allow the annular ring 22 (or an expanded end portion) of male member 12 to pass by the first and second wall sections 60 and 62 into the cavity 40 during insertion of the male member, yet large enough to retain the ring 22 (or expanded end portion) when combined with the thickness of the internal retainer arms 70 once the retainer 10 is moved into place, as described below.

The connecting end 44 of the female member 14 includes a substantially planar end surface for abutting the inner surface 90 of joining member 74. The outer diverging wall portion 54 and inner diverging wall section 60 each act to displace the external retainer flange 72 outwards and the internal retainer arms 70 inward, respectively, during mounting of the retainer 10 to the female member 14.

FIG. 1 shows the connector assembly in an assembled state, and FIG. 2 shows the connector assembly in an unassembled state. In operation, the male member 12 is inserted into the female member 14 such that the ring 22 is positioned in groove 56. When the ring 22 is positioned in groove 56, the inner side 58 of the groove 56 acts on a leading side of the annular ring 22 to resist further insertion of the male member 12 into the female member 14. In the illustrated embodiment, further insertion of the male member 12 is also prevented by contact of the connecting end 20 of the male member with annular shoulder 66. Prior to insertion of the male member 12, the retainer member 10 is positioned on the male member 12 with the circumference of opening 88 located between rings 22 and 18. During insertion, as force is applied to the retainer member 10 and male member 12 in the direction of the female member 14, the interior retainer arms 70 are radially displaced inward to pass by the second interior wall section 62. Due to the resilient nature of the retainer arms 70, they displace outwards again to extend axially when they reach the groove 56. During insertion of the retainer arms 70, the bevelled first interior wall section 60 of the female member 14 facilitates the insertion of the internal retainer arms 70.

At the same time that the internal retainer arms are inserted internally into the female member cavity 40, the external retainer flange 72 is outwardly displaced around the first outer wall portion of the female member 14. Due to the resilient nature of the external retainer arms 84 of external flange 72, the arms deflect inward once the lip portion 82 reaches shoulder area 48. The outer wall bevelled section 54 facilitates the outward deflection of external arms 84 during mounting of the retainer member 10. In an example embodiment, the lip 82 is bevelled in a complementary fashion to outer bevelled wall section 54 to facilitate mounting of the retainer 10.

Thus, as can be appreciated from FIG. 1, the inner retainer arms 70 extend a sufficient distance from the disc member 74 such that the outwardly directed ends 76 of the internal retainer fingers 70 extend into groove 56 of the female member 14. The external arms 84 are dimensioned such that when the inner surface 90 of joining member 74 bears against the first end 44 of the female member 14, the lip 82 snaps into engagement with female member external shoulder 48.

Both the internal retainer arms 70 and external retaining flange 72 and the cooperating portions of female member 14 are configured such that during assembly of the connection both the internal retainer arms 70 and the external retainer flange 72 snap into place when the connector is fully assembled. This snap-fit provides the person assembling the connector with an audible feedback and a physical "snap" feel feedback indicating that connection is complete. The assembler can also feel the joining member 74 abutting against the end 44 of the connecting member, thereby providing further physical feedback of the connection. Additionally, the assembler is provided with visual feedback of the connection through axial slots 86 that are provided about the circumference of external retainer flange 72.

The retainer 10 secures the male member 12 to the female member 14 in two ways. Firstly, in the event that axial force is applied to attempt to remove the male member 12 from the female member 14, the interference created between the ring 22, the internal shoulder 46 of female member groove 56 and the internal retainer arms 70 act against male insert 12. Thus, upon application of an axial force to attempt to remove male member 12 from female member 14, a compressive force is applied by the shoulder 16 of ring 22 and the shoulder 46 of groove to the opposite sides 78, 80 of the ends 76 of the internal retainer arms 70. Secondly, the inward lip 82 of external retainer flange 72 externally engages the shoulder 48 on the external wall of the female member 14, further acting against separation of the retainer 10 from the female member 14. In addition to acting against axial separation of the male and female members, the external flange 72 of retainer 10 also acts against lateral side to side or rocking movement of the male member 12 relative to the female member 14, thereby reducing wear on the seal ring 26.

The retainer 10, when engaged, acts as a cap to prevent debris and corrosive materials from entering the female connector, thus reducing the chance of corrosive or other materials from entering the joint area between the male and female members 12 and 14 and corroding the connection or otherwise affecting the seal therebetween.

As best seen in FIGS. 1 and 2, the joining member 74 of the retainer 10 in an example embodiment includes a flange or lip 92 that extends axially outward about the circumference of the central opening 88. The lip 92 effectively provides the joining member 74 with an enlarged surface area about the circumference of central opening 88 for surrounding the male member 12. The lip 92 cooperates with a further shoulder or ring 18 provided on the male member 12. Annular ring 18 may be formed integrally with male member 12, or may be a separate component secured to male member 12. The annular ring 18 and central opening 88 are respectively sized such that the retainer 10 can be pushed on the male member 12 with the ring 18 passing through the central opening 88 during insertion. The ring 18 temporarily displaces the resilient material of joining member 74 about the circumference of opening 88 when it passes through the opening 88 during mounting of the retainer 10 on the male member 12. As shown in FIG. 1, once the retainer 10 is mounted on the male member 12, the ring 18 has an outer diameter that is greater than the diameter of the central opening 88, with a distal end of the lip 92 generally abutting against or extending close to annular ring 18. The combination of annular ring 18 and lip 92 functions both to keep the retainer 10 in place on the member 12 when the member 12 is not secured to the female member 14, and also to provide a seal against debris and potentially corrosive material from entering the connection through the joint between the joining member 74 and the male member 12.

As can be seen in the Figures, in the illustrated embodiment the outer retainer flange 72 extends a further distance from the joining member 74 than the internal arms 70. Thus, in an unconnected state, the longer outer external retainer flange 72 protects the shorter internal retainer arms 70 from damage or breakage which may otherwise occur, especially in situations where the retainers are shipped pre-mounted on the male members 12. In some embodiments, the external flange 72 is sufficiently long to extend over and protect sealing ring 26 during shipping.

Figures 7, 8:
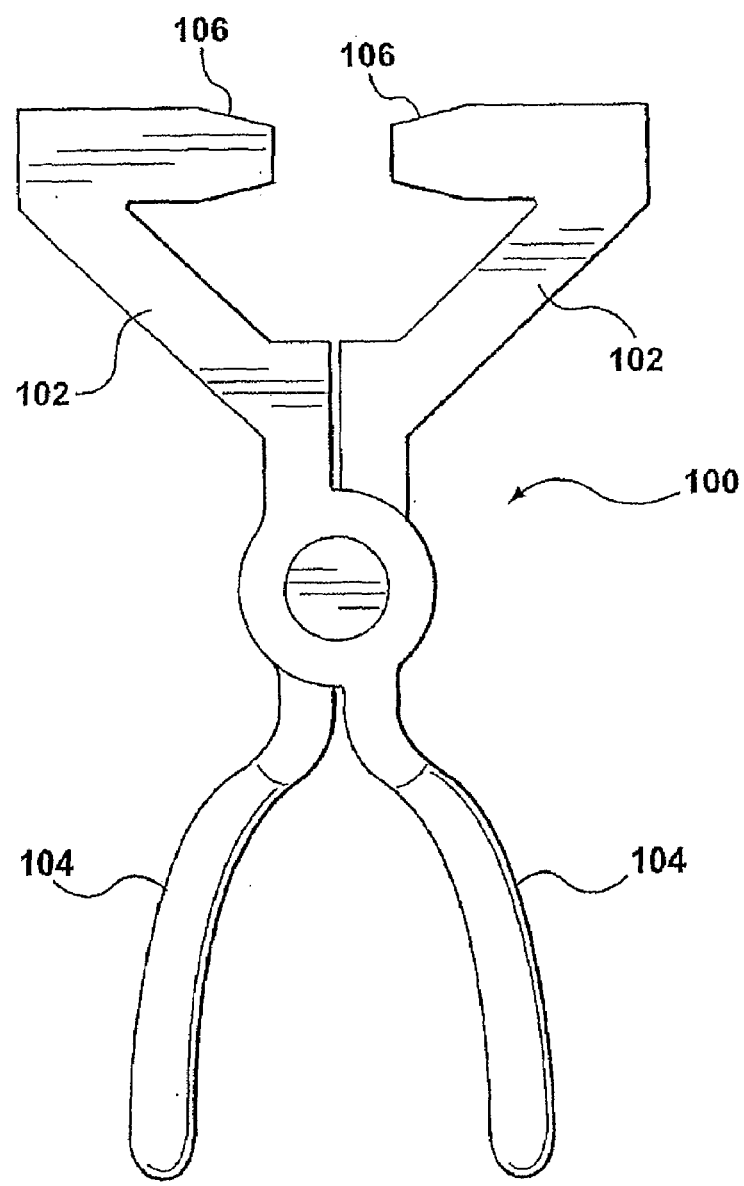
FIG. 7 is a side elevation of a removal tool for use with a connecter assembly of FIG. 1 according to example embodiment.
FIG. 8 is a partial end view of engagement ends of the removal tool of FIG. 7.

In an example embodiment, the retainer cap 10 can be removed by using a removal tool in conjunction with circumferential slots 94 which are provided through connector flange 72. An example of a suitable hand-held pliers-like removal tool 100 is shown in FIG. 7 in a closed state. The removal tool 100 includes a pair of pivotally mounted jaws 102 which can be moved apart from each other to an open state by pivoting handles 104 away from each other and which can be moved towards each other to the closed state by squeezing handles 104 together. Each jaw member 102 includes an inwardly facing engagement end 106 which is adapted to fit through one of the tooling slots 94 in the retainer 10. In an example embodiment, in the closed state the opposed engagement ends 106 are spaced apart from each other a distance that is greater than an outer circumference of the inner retainer arms 70, but less than the largest circumference of the female first wall section 60. Additionally, as best seen in FIG. 8, the ends 106 are wedge-shaped so that they can be wedged between the female member end 44 and the inner surface of joining member 74. Accordingly to remove retainer cap, the engagement ends 106 of removal tool 100 are inserted through opposite facing tooling slots in the retainer 10, and then handle members 104 are squeezed together. This causes the engagement ends 102 to wedge between the connecting end 44 of the female member and the inner surface 90 of the joining member 74. The axial force provided by the wedging of ends 102 of tool 100 between the female member end 44 and the inner surface 90 of joining member 74 is sufficient enough to disengage the lip 82 on outer flange 72 from the female member 14, and to withdraw internal retainer arms 70 from female member groove 56. Accordingly, with tool 100, retainer member 10 can be quickly disengaged from the female member 14, thereby allowing separation of the male member 12 from the female member 14.

In an alternative example embodiment, in addition to wedging between the female member end 44 and retainer joining member 74, the engagement ends 106 of tool 100 are spaced closed enough together when in the closed state to engage and radially compress the internal retainer arms 70 to further assist in disengaging the internal retainer arm ends 76 from the female member groove 56. As best seen in FIG. 1, the retainer arms 70 are radially spaced from the male member 12 to permit such radial compression. In such alternative embodiment, the tool ends 106 may be curved to accommodate the curved outer surfaces of the internal retainer arms 70.

Various changes may be made to the connector described herein without departing from the scope of invention. By way of example, the retainer arms 70 are each shown as having a uniform length in the figures. However, in some embodiment not all the internal retainer arms 70 may be the same size or length, for example, alternating arms 70 could have different lengths to provide for different insertion, securing and removal forces depending on the use of the connector assembly. In some embodiments, the end 76 of each arm could be enlarged relative to the rest of the arm 70. In some embodiments, an outer retainer flange 72 may not include lip 82, but just rather employ a friction fit between the fingers 84 and outer wall 50 of the female member. In some embodiments, all or parts of the retainer 10 could be coated with silicon or Teflon™ or other low friction coating 96 to facilitate mounting of the retainer 10 (see FIG. 4). Although the connector assembly has been described above as being used in combination with tubular members, a connector could also be used to connect non tubular male and female members.

The above-described embodiments of the invention are intended to be examples only. Alterations, modifications and variations may be effected to the particular embodiments by those skilled in the art without departing from the scope of the invention, which is defined by the claims appended hereto.

We claim:

1. A connector assembly comprising:
   a male member having an circumferential external shoulder on an outer surface thereof;
   a female member having a cavity defined by an inner circumferential wall for receiving the male member, the cavity extending from a first end to an interior portion of the female member, the circumferential wall defining an internal shoulder, the female member having a circumferential external shoulder on an outer surface thereof; and
   a retainer member surrounding a portion of the male member, the retainer member including a plurality of circumferentially spaced resilient internal retainer arms and an annular external retainer flange, the external flange being radially spaced from the internal retainer arms and connected thereto by a radial joining member, the internal retainer arms each having a distal end for simultaneously engaging the male member external shoulder and the female member internal shoulder when the male member is within the female member, the external flange having a distal end defining a radially inwardly extending protrusion for engaging the female member external shoulder when the male member is within the female member.

2. The connector assembly of claim 1 wherein the external flange includes a plurality of axial openings dividing the external flange into a plurality of resilient axially extending external retainer fingers, the radially inwardly extending protrusion including a radially inwardly extending lip on at least some of the retainer fingers for engaging the female member external shoulder.

3. The connector assembly of claim 1 wherein at least two semi-circumferential slot-shaped openings are formed through the external flange near the radial joining member and spaced apart from the distal end of the external flange.

4. The connector assembly of claim 1 wherein the joining member is disc shaped having a central opening through which the male member extends, the joining member having a first surface for engaging the first end of the female member.

5. The connector assembly of claim 4 wherein the joining member includes a resilient sealing flange extending axially therefrom surrounding the central opening for engaging the male member.

6. The connector assembly of claim 1 wherein the distal ends of the internal retainer arms are adapted to be compressed between the male member external shoulder and the female member internal shoulder when the male member is within the female member to create an interference fit therebetween.

7. The connector assembly of claim 1 wherein the distal ends of the internal retainer arms are angled radially outward and each include opposite facing first and second surfaces for engaging the male member external shoulder and the female member internal shoulder, respectively.

8. The connector assembly of claim 1 wherein the retainer member is formed as a unitary structure from resilient plastic.

9. The connector assembly of claim 1 wherein the outer surface of the female member is defined by an outer annular wall having a first section and a second section, the first section being located between the first end and the second section and having an outer diameter greater than that of the second section, a transition between the first section and the second section defining the female member external shoulder, wherein the external flange extends axially along the first section.

10. The connector assembly of claim 9 wherein the outer annular wall includes a third section that extends from the first end to the first section, the diameter of the third section increasing from the first end to the first section for expanding the distal end of the external flange radially outward as the retainer member is slid onto the female member.

11. The connector assembly of claim 1 wherein the inner circumferential wall includes an annular groove formed therein and having first and second substantially opposed sides, the first side being closer to the first end than the second side, the first side defining the female member internal shoulder.

12. The connector assembly of claim 11 wherein the second side of the annular groove defines a further female member internal shoulder for engaging the male member external shoulder to prevent insertion of the male member into the female member beyond a predetermined point.

13. The connector assembly of claim 1 wherein the joining member includes a central opening through which the male member extends, and the male member includes a further circumferential external shoulder on the outer surface thereof in a location that is on an opposite side of the central opening than the female member when the male member is within the female member, the further circumferential external shoulder having a diameter larger than that of the central opening.

14. The connector assembly of claim 13 wherein the joining member includes a resilient sealing flange about a circumference of the central opening and extending axially towards the further circumferential external shoulder.

15. The connector assembly of claim 1 wherein the external flange extends a greater axial distance from the joining member than the internal retainer arms.

16. A connector assembly including:
a tubular male member having an increased diameter circumferential portion;
a tubular female member having an inner annular wall defining a cavity opening at a first end of the female member for receiving the male member, the inner annular wall having an annular groove formed therein and spaced apart from the first end, the female member having an outer annular wall; and
a retainer member for releasably joining the male member to the female member, the retainer member including a plurality of resilient interior retainer arms having end portions adapted to simultaneously engage the increased diameter circumferential portion and a side of the annular groove when the male member is joined to the female member to create an interference fit therebetween, the retainer member including an outer annular flange spaced radially apart from the interior retainer arms and adapted to engage the female member outer annular wall when the male member is joined to the female member, the interior retainer arms being joined to the outer annular flange by a joining member through which the male member extends, the joining member being adapted to engage the female member first end when the male member is joined to the female member.

17. The connector assembly of claim 16 wherein a diameter of the female member outer annular wall decreases at a circumferential shoulder that is spaced apart from and faces a substantially opposite direction than the first end, the outer annular flange of the retainer member including a radially inward projection at an end thereof adapted to engage the circumferential shoulder when the male member is joined to the female member.

18. The connector assembly of claim 17 wherein the outer flange includes a plurality of semi-circular circumferentially spaced resilient outer retainer arms, the radially inward projection including a lip on each of the outer retainer arms.

19. The connector assembly of claim 18 wherein the outer retainer arms are adapted to radially defect outwards when passing over the female member outer wall.

* * * * *